(12) United States Patent
Koike et al.

(10) Patent No.: US 7,888,829 B2
(45) Date of Patent: Feb. 15, 2011

(54) VEHICLE AC GENERATOR

(75) Inventors: Akihito Koike, Kariya (JP); Yoshiki Tan, Anjo (JP); Masatoshi Koumura, Okazaki (JP)

(73) Assignee: Denso Corporation, Kariya (JP)

( * ) Notice: Subject to any disclaimer, the term of this patent is extended or adjusted under 35 U.S.C. 154(b) by 547 days.

(21) Appl. No.: 11/892,777

(22) Filed: Aug. 27, 2007

(65) Prior Publication Data

US 2008/0061639 A1      Mar. 13, 2008

(30) Foreign Application Priority Data

Sep. 12, 2006    (JP) .............................. 2006-246927

(51) Int. Cl.
    *H02K 9/00*    (2006.01)
(52) U.S. Cl. .......................................... 310/58; 310/52
(58) Field of Classification Search ................... 310/52, 310/58, 62, 64
    See application file for complete search history.

(56) References Cited

U.S. PATENT DOCUMENTS

| | | | |
|---|---|---|---|
| 5,710,467 A * | 1/1998 | Irie et al. ...................... | 310/64 |
| 5,825,116 A | 10/1998 | Ishikawa | |
| 5,903,073 A * | 5/1999 | Mukai .......................... | 310/64 |
| 5,936,326 A | 8/1999 | Umeda et al. | |
| 5,952,749 A | 9/1999 | Umeda et al. | |
| 5,955,810 A | 9/1999 | Umeda et al. | |
| 5,965,965 A | 10/1999 | Umeda et al. | |
| 5,982,068 A | 11/1999 | Umeda et al. | |
| 5,986,375 A | 11/1999 | Umeda et al. | |
| 5,994,813 A | 11/1999 | Umeda et al. | |
| 5,998,903 A | 12/1999 | Umeda et al. | |
| 6,011,332 A | 1/2000 | Umeda et al. | |
| 6,051,906 A | 4/2000 | Umeda et al. | |
| 6,097,130 A | 8/2000 | Umeda et al. | |

(Continued)

FOREIGN PATENT DOCUMENTS

JP        A-60-204240         10/1985

(Continued)

OTHER PUBLICATIONS

Japanese Office Action in Japanese Patent Application No. 2006-246927, mailed Nov. 24, 2009 with English translation.

(Continued)

*Primary Examiner*—Nguyen N Hanh
(74) *Attorney, Agent, or Firm*—Oliff & Berridge, PLC (57) ABSTRACT

The vehicle AC generator includes a frame including an end wall section and a peripheral wall section, a stator core, a stator coil having rear and front coil ends projecting axially rearward and frontward respectively from the stator core, a rotor supported by the frame, and a cooling fan having centrifugal blades and fixed to the rotor. The peripheral wall section has a cooling air discharge opening adjoining the end wall section. The end wall section has a centrifugal-blade-facing portion axially facing the centrifugal blades, and a coil-end-facing portion axially facing the rear coil end. The coil-end-facing portion is bent at a predetermined curvature radius and extending from the centrifugal-blade-facing portion to the cooling air discharge opening. The inner end surface of the coil-end-facing portion is formed with a recess located axially rearwardly of a radial extension line of an inner end surface of the centrifugal-blade-facing portion.

3 Claims, 7 Drawing Sheets

U.S. PATENT DOCUMENTS

| | | | |
|---|---|---|---|
| 6,124,660 | A | 9/2000 | Umeda et al. |
| 6,137,201 | A | 10/2000 | Umeda et al. |
| 6,144,136 | A | 11/2000 | Umeda et al. |
| 6,181,043 | B1 | 1/2001 | Kusase et al. |
| 6,181,045 | B1 | 1/2001 | Umeda et al. |
| 6,198,190 | B1 | 3/2001 | Umeda et al. |
| 6,291,918 | B1 | 9/2001 | Umeda et al. |
| 6,459,186 | B1 | 10/2002 | Umeda et al. |
| 7,619,333 | B2 * | 11/2009 | Koumura et al. ............... 310/64 |
| 2002/0047445 | A1 | 4/2002 | Ooiwa |
| 2004/0207275 | A1 * | 10/2004 | Sakakibara et al. ........... 310/58 |
| 2004/0251766 | A1 * | 12/2004 | Kometani et al. ........... 310/216 |

FOREIGN PATENT DOCUMENTS

| | | |
|---|---|---|
| JP | U-5-11768 | 2/1993 |
| JP | A-7-46795 | 2/1995 |
| JP | B2 2927288 | 7/1999 |
| JP | B2 2997288 | 1/2000 |
| JP | A-2002-78261 | 3/2002 |
| JP | B2 3709590 | 10/2005 |
| WO | WO 2005/064772 A1 | 7/2005 |

OTHER PUBLICATIONS

H. Sakakibara, "Vehicle Alternator", Journal of Nippon Denso Technical Disclosure, No. 52-292, Mar. 15, 1987, p. 292 (w/ Eng. Abs.).

O. Yoshida et al., "Vehicle Alternator", Journal of Japan Institute of Invention and Innovation, vol. 11-55, No. 86-16018, Dec. 20, 1986, pp. 1-3 (w/ Eng. Abs.).

* cited by examiner

VEHICLE AC GENERATOR

CROSS-REFERENCE TO RELATED APPLICATION

This application is related to Japanese Patent Application No. 2006-246927 filed on Sep. 12, 2006, the contents of which are hereby incorporated by reference.

BACKGROUND OF THE INVENTION

1. Field of the Invention

The present invention relates to a vehicle AC generator, and particularly relates to improvement in a frame structure of the vehicle AC generator.

2. Description of Related Art

There is a strong demand that vehicle AC generators should be compact in size and light in weight, and have high output power and high efficiency. To address such a demand, the vehicle AC generators need to have enhanced air cooling performance. Accordingly, a typical conventional vehicle AC generator is configured as follows. The rear frame thereof includes a peripheral wall section and an end wall section. The end wall section has a centrifugal blade-facing portion facing axial front ends of centrifugal blades of a cooling fan, and a coil end-facing portion facing a coil end of a stator coil. The coil end-facing portion, which extends from the centrifugal blade-facing portion toward the peripheral wall section, is bent at a predetermined curvature radius. The reason why the coil end-facing portion is bent to the side of the coil end of the stator coil is to satisfactorily cool the coil end by deflecting the cooling air, which is being blown radially outward along an inner end surface of the end wall section by the centrifugal blades (cooling fan) mounted to a rotor end surface, toward the coil end of the stator coil as much as possible.

It is known to form cooling air passages in the coil end of a stator coil to improve the cooling performance, as disclosed in Japanese Patent Gazette No. 2997288 which describes a vehicle AC generator employing a stator coil of the segment-sequential-connection type.

It is also known to increase the size of a cooling air discharge window formed in an outer periphery of a frame of a vehicle AC generator in order to let the cooling air flow smoothly from the discharge window, as disclosed in Journal of Nippon Denso Technical Disclosure published Mar. 15, 1987.

It is also known to provide a fan guide facing a cooling fan with a projection at a position radially outwardly of the cooling fan in order to block the cooling air backflowing through a clearance between the cooling fan and the fan guide, to thereby improve the cooling efficiency, as disclosed in Journal of Japan Institute of Invention and Innovation published Dec. 20, 1986.

However, the stator coil cooling capacity of the structure disclosed in Japanese Patent Gazette No. 2997288 is insufficient to meet the increasing demand that vehicle AC generators should be compact in size and light in weight, and have high output power and high efficiency. In addition, to attain high perceived quality in quietness of a vehicle, it becomes necessary to redue the noise of the cooling fan. Accordingly, it has been proposed to increase the size of the cooling fan, or the number of the fan blades, because increasing the cooling air volume is effective in increasing the stator coil cooling capacity. However, increasing the cooling air volume leads to upsizing of the vehicle AC generator, and increase of the fan driving power. This also derives the problem of large wind noise.

Journal of Nippon Denso Technical Disclosure mentioned above discloses a structure in which a step portion is formed in a rear frame end wall section so that the height of the cooling air discharge window can be increased to smoothly discharge the cooling air therethrough without changing the longitudinal length of the generator. However, this structure does not improve the stator coil cooling capacity. This structure is intended to improve a rectifier device cooling capacity by increasing the cooling air volume, however, this cause the problem of large wind noise as in the above case.

Journal of Japan Institute of Invention and Innovation mentioned above discloses forming a ring-shaped projection in the fan guide to prevent the cooling air blown by the cooling fan from backflowing, to thereby improve the cooling efficiency. However, this structure does not have means for improving the stator coil cooling capacity. In addition, in this structure, the cooling fan may be deformed and interfere with other members when the rotor of the generator is driven at high speed (20,000 rpm, for example.)

SUMMARY OF THE INVENTION

The present invention provides a vehicle AC generator comprising:

a frame including an end wall section and a peripheral wall section; a stator core fixed to an inner peripheral surface of the peripheral wall section;

a stator coil constituted by a plurality of phase coils, the stator coil being wound around the stator core and having rear and front coil ends projecting axially rearward and frontward respectively from the stator core;

a rotor located radially inwardly of the stator core and being rotatably supported by the frame; and a cooling fan having centrifugal blades and fixed to an end surface of the rotor;

the peripheral wall section having a cooling air discharge opening adjoining the end wall section, the end wall section having a centrifugal-blade-facing portion axially facing the centrifugal blades, and a coil-end-facing portion axially facing the rear coil end, the coil-end-facing portion being bent at a predetermined curvature radius and extending from the centrifugal-blade-facing portion to the cooling air discharge opening, an inner end surface of the coil-end-facing portion being formed with a recess located axially rearwardly of a radial extension line of an inner end surface of the centrifugal-blade-facing portion.

The present invention also provides a vehicle AC generator comprising:

a frame including an end wall section and a peripheral wall section;

a stator core fixed to an inner peripheral surface of the peripheral wall section;

a stator coil constituted by a plurality of phase coils, the stator coil being wound around the stator core and having rear and front coil ends projecting axially rearward and frontward respectively from the stator core;

a rotor located radially inwardly of the stator core and being rotatably supported by the frame; and a cooling fan having centrifugal blades and fixed to an end surface of the rotor;

the peripheral wall section having a cooling air discharge opening adjoining the end wall section, the end wall section having a centrifugal-blade-facing portion axially facing the centrifugal blades, and a coil-end-facing portion axially facing the rear coil end, the coil-end-facing portion being bent at a predetermined curvature radius and extending from the centrifugal-blade-facing portion to the cooling air discharge opening, an inner end surface of the coil-end-facing portion being formed with a plurality of linear recess grooves and a plurality of linear projection walls respectively extending radially outward and arranged so as to alternate with each other at a predetermined pitch along a circumferential direction of the rotor.

The present invention also provides a vehicle AC generator comprising:

a frame including an end wall section and a peripheral wall section;

a stator core fixed to an inner peripheral surface of the peripheral wall section;

a stator coil constituted by a plurality of phase coils, the stator coil being wound around the stator core and having coil ends projecting axially rearward and frontward respectively from the stator core;

a rotor located radially inwardly of the stator core and being rotatably supported by the frame; and a cooling fan having centrifugal blades and fixed to an end surface of the rotor;

the peripheral wall section having a cooling air discharge opening adjoining the end wall section, the end wall section having a centrifugal-blade-facing portion axially facing the centrifugal blades, and a coil-end-facing portion axially facing the rear coil end, the coil-end-facing portion being bent at a predetermined curvature radius and extending from the centrifugal-blade-facing portion to the cooling air discharge opening, an inner end surface of the coil-end-facing portion being formed with a projection extending along a circumferential direction of the rotor at a position adjoining the cooling air discharge opening and projecting toward the rear coil end.

According to the present invention, it is possible to provide a vehicle AC generator having a good stator coil cooling performance and less wind noise.

Other advantages and features of the invention will become apparent from the following description including the drawings and claims.

PREFERRED EMBODIMENTS OF THE INVENTION

First Embodiment

Figure 1:
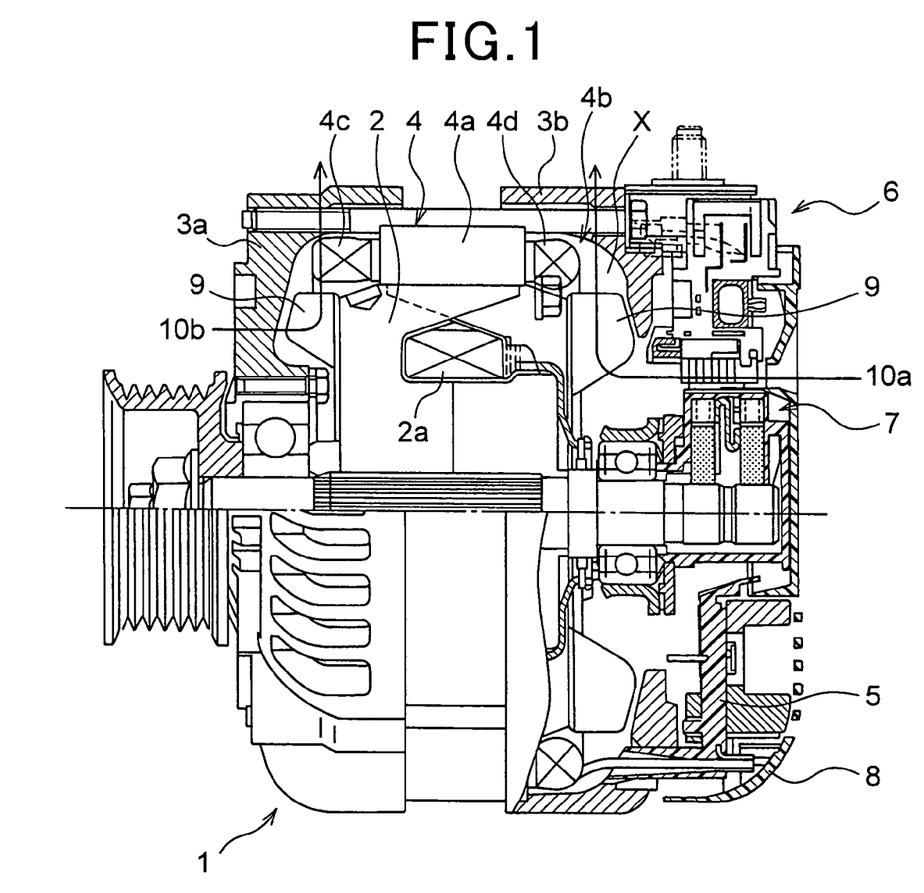
FIG. 1 is an axial cross-sectional view of a vehicle AC generator according to a first embodiment of the invention.

FIG. 1 is an axial cross-sectional view of a vehicle AC generator 1 according to a first embodiment of the invention.

This generator 1 includes a rotor 2 driven to rotate by being applied with torque transmitted from an vehicle engine (not shown) through a pulley, front and rear frames 3a, 3b each of which has a bowl-like shape and rotatably supports the rotor 2 through a bearing, a stator 4 caught between the frames 3a, 3b, a rectifier device 5, a regulator 6 adjusting a rectified DC output voltage of the rectifier device 5 at a desired value, a brush device 7 supplying an excitation current to a field winding 2a of the rotor 2 through a slip ring (not shown), an end cover 8 having a bowl-like shape and fitted to the frame 3b so as to cover the rectifier device 5, regulator 6 and brush device 7, and a pair of cooling fans 9 respectively fixed to the front and rear end surfaces of the rotor 2.

The stator 4 includes a stator core 4a having a cylindrical shape and disposed radially outwardly of the rotor 2, and a stator coil 4b wound around the stator core 4a. The stator coil 4b has a coil end 4c projecting axially frontward from the stator core 4a, and a coil end 4d projecting axially rearward from the stator core 4a. Hereinafter, the coil end 4c is referred to as a front coil end, and the coil end 4d is referred to as a rear coil end.

Figure 2:
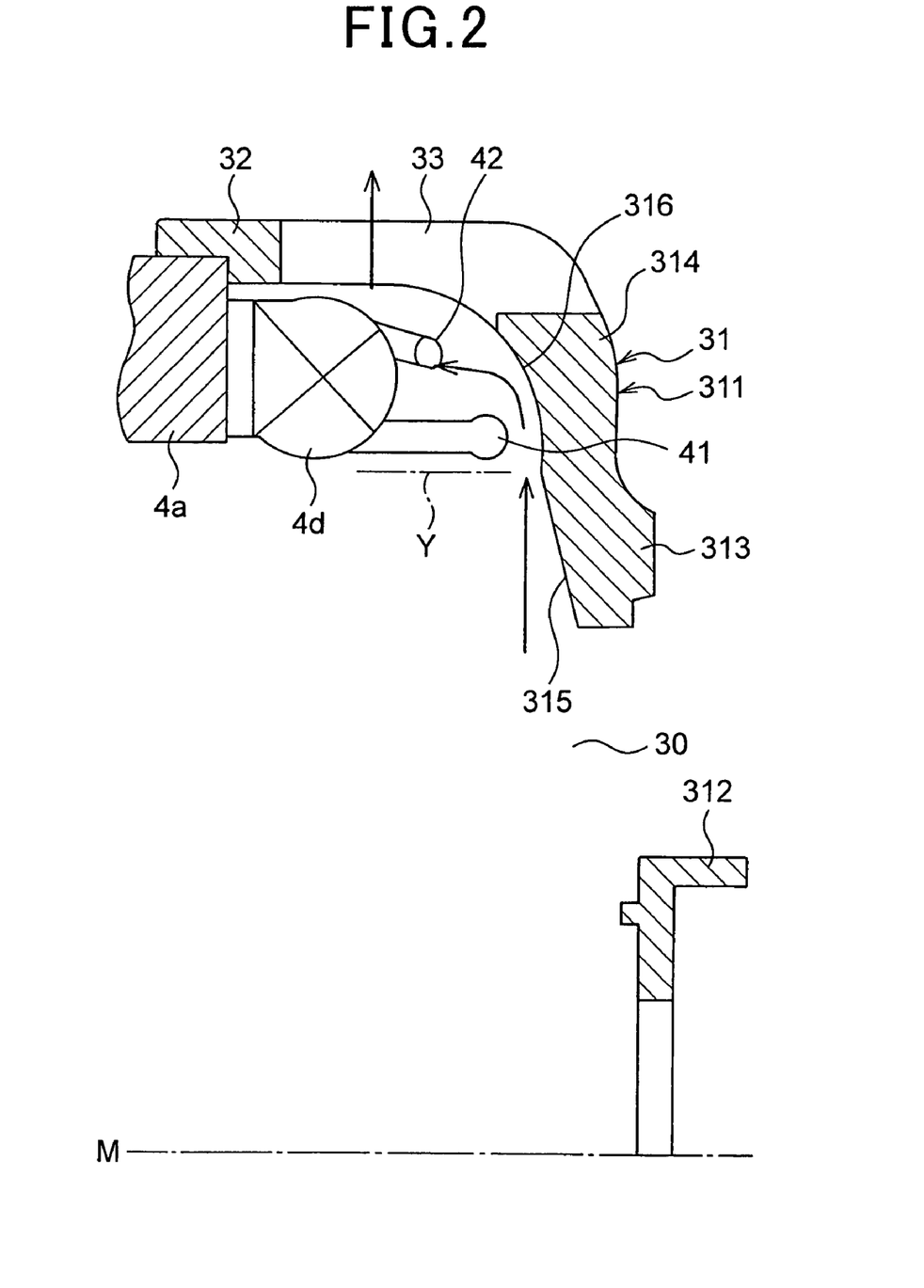
FIG. 2 is a partially enlarged view of FIG. 1 showing a part a rear frame of the vehicle AC generator.

In FIG. 2, which is a partially enlarged view of FIG. 1, each of the reference numeral 41, 41 denotes an axially projecting wiring section which extends axially behind a ring-like main section of the rear coil end 4d. In this embodiment, the axially projecting wiring sections 41, 42 are assumed to constitute a part of the rear coil end 4d. Each of the axially projecting wiring sections 41, 42 is constituted by a crossover wiring section including circumferential crossover wires and axial crossover wires, and a neutral wiring section.

In this embodiment, each of three phase coils of the stator coil 4b is constituted by a plurality of partial coils series-connected by the circumferential crossover wires or the axial crossover wires. It is preferable that the circumferential crossover wires and the axial crossover wires are arranged such that they extend axially rearward from the ring-like main section of the rear coil end 4d constituted by coil ends of the partial coils. The neutral wiring section includes neutral wires extending in the circumferential direction and connecting one ends of the phase coils located in different circumferential positions to a neutral point. It is preferable that the neutral wires are also arranged such that they extend axially rearward from the ring-like main section of the rear coil end 4d.

The cooling fan 9 on the rear side has centrifugal blades located radially outwardly of cooling air intake holes 30 formed in the rear frame 3b, and radially inwardly of the stator coil 4b. As shown in FIG. 1, the cooling fan 9 is located radially inwardly of an axial clearance X between the rear coil end 4d and the inner end surface of the frame 3b. It should be noted that, although not shown in FIG. 1, the circumferential crossover wires, axial crossover wires and neutral wires of the rear coil end 4d are located in the axial clearance X.

The cooling fan 9 on the rear side operates to centrifugally blow the cooling air flowing into the frames 3a, 3b through cooling air intake windows formed in the end cover 8 and cooling air intake holes 30 formed in the frame 3b, in order to cool the stator coil 4b and other members. Since the location, structure, and operation of the cooling fan on the front side are similar to those of the cooling fan on the rear side, explanation thereof is omitted.

Next, explanation is made as to the frame 3b with reference to FIG. 2.

The frame 3b, which is constituted by an end wall section 31 and a peripheral wall section 32, is integrally formed in the shape of a bowl by an aluminum die casting process. Since the frame 3a is similar to the frame 3b in structure, explanation of the frame 3a is omitted.

The peripheral wall section 32 has a cooling air discharge opening 33 extending along roughly entire periphery thereof at its rear end portion adjoining the peripheral edge of the end wall section 31. The cooling air discharge opening 33 is provided with a plurality of ribs arranged at regular intervals along the circumferential direction. The end wall section includes a ring section 311 located radially outwardly of the cooling air intake holes 30, a boss section 312 supporting a rotating shaft of the rotor, and a spoke section radiating from the boss section 312 to the ring section 311.

The ring section 311 of the end wall section 31 includes a centrifugal-blade-facing portion 313 located radially inwardly of a radially outer end portion of the cooling fan 9 shown by the two-dot chain line Y in FIG. 2 and axially facing an axially rear end portion of the cooling fan 9, and a coil-end-facing portion 314 located radially outwardly of the radially outer end portion of the cooling fan 9 and axially facing the rear coil end 4d. The centrifugal-blade-facing portion 313 is in contact with the cooling air intake holes 30 at its radially inner end surface 315. The coil-end-facing portion 314 is in contact with the cooling air discharge opening 33 at its radially inner end portion. In FIG. 2, the reference numeral 315 denotes an inner end surface of the centrifugal-blade-facing portion 313, and the reference numeral 316 denotes an inner end surface of the coil-end-facing portion 314.

Figure 3:
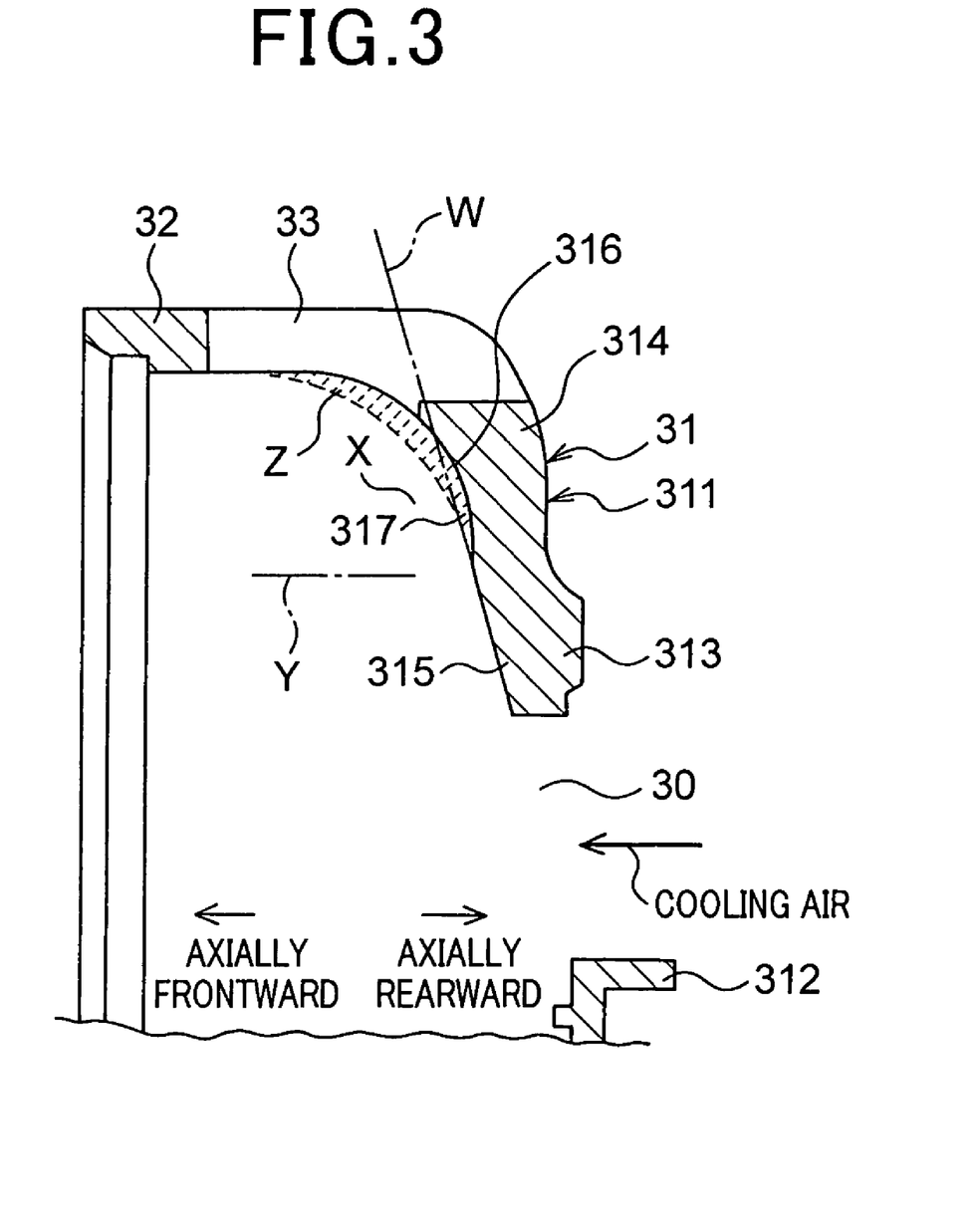
FIG. 3 is a partially enlarged view of FIG. 2.

Next, explanation is made as to a shape of the inner end surface 316 of the coil-end-facing portion 314, which constitutes a characteristic feature of this embodiment with reference to FIG. 3 which is a partially enlarged view of FIG. 2. In FIG. 3, the stator core 4a and the rear coil end 4d are omitted from illustration. The broken-line hatched area in FIG. 3 shows a portion cut from an inner end surface of a conventionally formed coil-end-facing portion to make the inner end surface 316 of the coil-end-facing portion 314 of this embodiment.

In this embodiment, the inner end surface 316 of the coil-end-facing portion 314 is formed with a ring-shaped recess 317 located axially rearwardly of an extension line W of the inner end surface 315 of the centrifugal-blade-facing portion 313 extending in the radially outward direction. In other words, the inner end surface 316 of the coil-end-facing portion 314 extends radially outward in a curve curving to the axially rear side from the radially outer end of the inner end surface 315 of the centrifugal-blade-facing portion 313. As shown in FIG. 2, the inner end surface 316 of the coil-end-facing portion 314 is bent axially inward more largely at the radially outer end portion thereof than at the radially inner end portion thereof.

In FIG. 3, the two-dot chain line Z shows a shape of the inner end surface of the conventionally formed coil-end-facing portion in the axial cross section. As seen from FIG. 3, the inner end surface of the conventionally formed coil-end-facing portion is R-shaped to smoothly connecting the inner end surface 315 of the centrifugal-blade-facing portion 313 with the inner peripheral surface of the peripheral wall section 32, and is not formed with the recess 317.

In the following, hydrodynamic effects of the recess 317 are explained.

First, the cooling air flowing along the inner end surface 315 of the centrifugal-blade-facing portion 313 and the inner end surface 316 of the coil-end-facing portion 314 is deflected axially frontward at a border area between the inner end surface 315 and the inner end surface 316. Since this means that a cross-sectional area of the cooling air passage increases, there occurs a vortex flow of the cooling air. This increases the cooling performance on the frame 3b because a boundary layer separates from the frame 3b. In addition, since the cooling air becomes turbulent, and as a result, part of the cooling air flows toward the rear coil end 4d, the cooling performance on the rear coil end 4d is also improved. Furthermore, the axially projecting wiring sections 41, 42 located in the clearance X between the rear coil end 4d and the inner end surface 316 of the coil-end-facing portion are also well cooled by the turbulence of the cooling air.

Secondly, since the inner end surface 316 of the coil-end-facing portion 314 is bent axially rearward at its radially inner portion, the radially outer portion of the inner end surface 316 of the coil-end-facing portion 314 is bent axially frontward bent more largely than the radially outer portion of the conventionally formed inner end surface shown by the two-dot chain line Z.

As a result, the cooling air flowing axially rearward along the radially inner portion of the inner end surface 316 of the coil-end-facing portion 314 is deflected axially frontward due to the abrupt bend toward the axially front side of the inner end surface 316 of the coil-end-facing portion 314. It follows that the cooling air is blown on the rear coil end 4d to cool the rear coil end 4d.

Thirdly, the provision of the recess 317 provides the advantage of increasing an axial clearance between the tips of the axially projecting wiring section 41, 42 of the rear coil end 4d and the inner end surface 316 of the coil-end-facing portion 314. This improves electrical insulation of the axially projecting wiring sections 41, 42.

It should be noted that the above explained shape of the inner end surface 316 of the coil-end-facing portion 314 may be adopted for the front coil end 4c.

Figure 4:
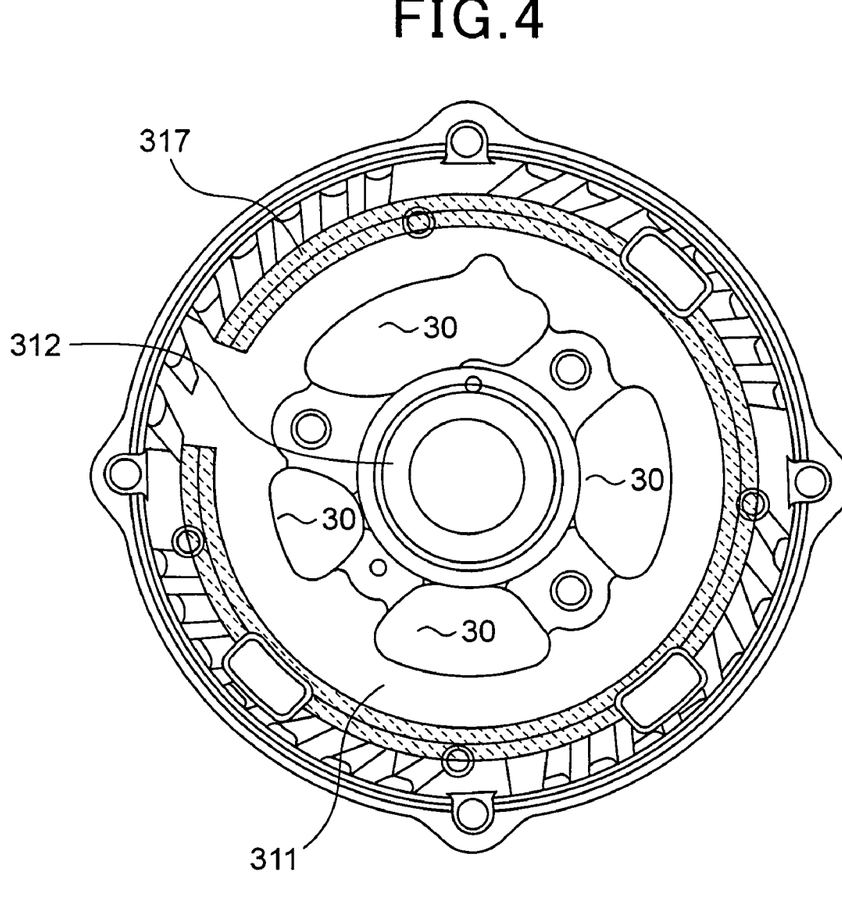
FIG. 4 is a front view of the rear frame as viewed from the axially rear side.

FIG. 4 shows the shape of the recess 317 in the radial cross section. In this figure, the recess 317 formed in the shape of circular arcs is hatched. The cooling air intake holes 30 are not located where the recess 317 does not exist in the radially outer side to increase the rigidity of the frame 3b. The number of the portions where the recess 317 is not formed may be any number.

Figure 5:
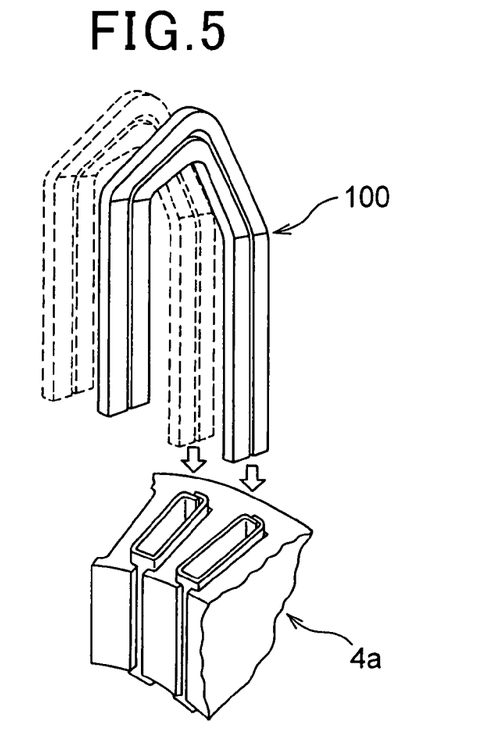
FIG. 5 is a perspective view explaining a stator coil of the segment-sequential-connection type.
Figure 6:
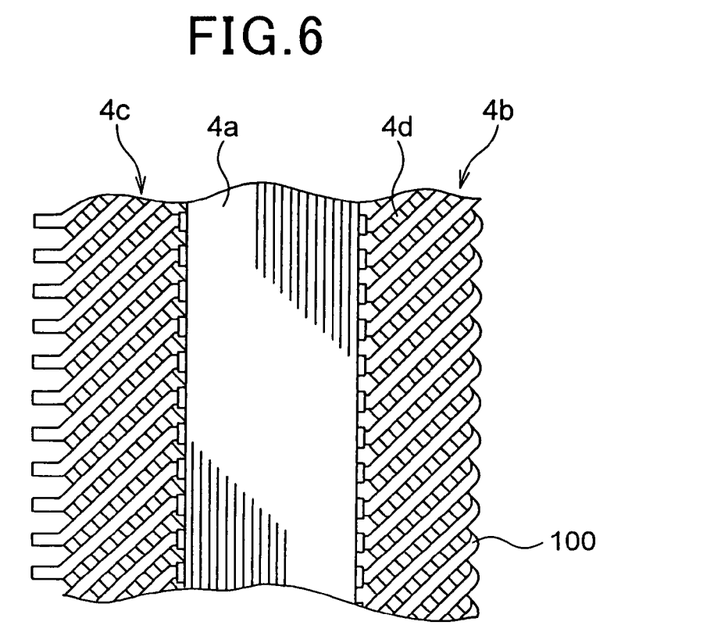
FIG. 6 is a partial plan view of a stator including the stator coil of the segment-sequential-connection type.

Next, explanation is made as to the stator coil 4b. In this embodiment, as the stator coil 4b, there is used a stator coil of the segment-sequential-connection type as shown in FIG. 5 and FIG. 6. The stator coil of the segment-sequential-connection type has a structure in which U-shaped segment conductors 100 (see FIG. 5) are inserted into slots of the stator core 4a from axially behind the stator core 4a, and the ends of the U-shaped segment conductors 100 projecting axially forward from the stator core 4a are sequentially connected one another. For further details, refer to Japanese Patent Gazette No. 2997288, for example. As seen from FIG. 6, the front coil end 4c and the rear coil end 4d of the stator coil 4b of the segment-sequential-connection type have a structure in which the U-shaped segment conductors 100 are three-dimensionally arranged in an orderly manner. This makes it possible to provide small cooling air passages arranged in an orderly manner such that they intervene between the adjacent U-shaped segment conductors 100. This also makes it possible to accurately determine the positions of the axially projecting wiring sections 41, 42, which makes it possible to prevent the axially projecting wiring sections 41, 42 from excessively nearing or contacting the recess 317.

Second Embodiment

Figure 7:
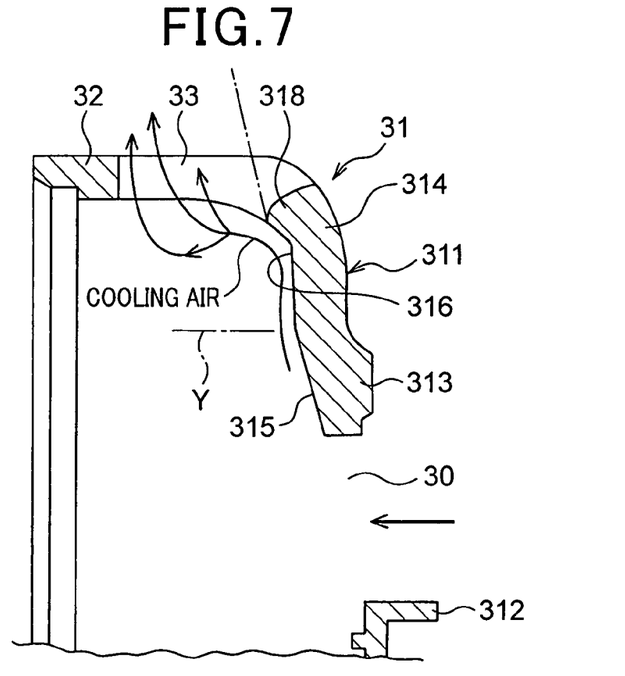
FIG. 7 is a cross-sectional view of major parts of a rear frame of a vehicle AC generator according to a second embodiment of the invention.

Next, a second embodiment of the invention is explained with reference to FIG. 7. The second embodiment differs from the first embodiment in the shape of the inner end surface 316 of the coil-end-facing portion 314.

In this embodiment, the inner end surface 316 is provided with a knot-like projection 318 projecting axially frontward at a radialy outer end portion thereof adjoining the cooling air discharge opening 33. This knot-like projection 318 is formed in a ring-like shape or an arc-like shape like the recess 317 described in the first embodiment.

In this embodiment, since the cooling air flowing along the inner end surface 316 of the coil-end-facing portion 314 and reaching the radially outer end portion of the frame 3b is forcibly deflected toward the rear coil end 4d by the knot-like projection 318, it is possible to improve the cooling performance on the rear coil end 4d without increasing the volume of the cooling air.

Since the knot-like projection 318 is provided in the radially outer end portion of the coil-end-facing portion 314, there is no fear that the axially projecting wiring sections 41, 42 interfere with the knot-like projection 318.

Third Embodiment

Figure 8:
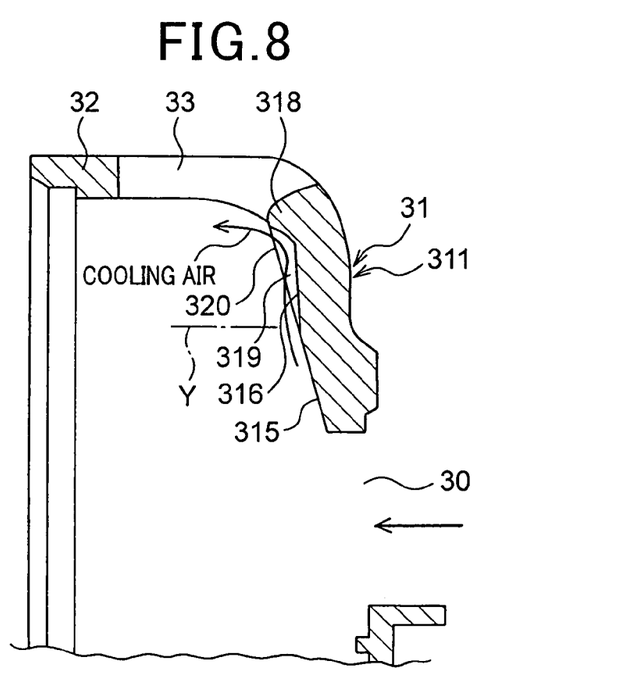
FIG. 8 is a cross-sectional view of major parts of a rear frame of a vehicle AC generator according to a third embodiment of the invention.

Next, a third embodiment of the invention is explained with reference to FIG. 8. The third embodiment differs from the second embodiment in the shape of the inner end surface 316 of the coil-end-facing portion 314.

In this embodiment, in addition to the knot-like projection 318, linear recess grooves 319 and linear projection walls 320 are provided in the inner end surface 316 of the coil-end-facing portion 314 such that they are located radially inwardly of the knot-like projection 318, and peripherally alternate with each other at a certain pitch. Each recess groove 319 extends from the inner end surface 315 of the centrifugal-blade-facing portion 313 to the cooling air discharge opening 33.

Figure 9:
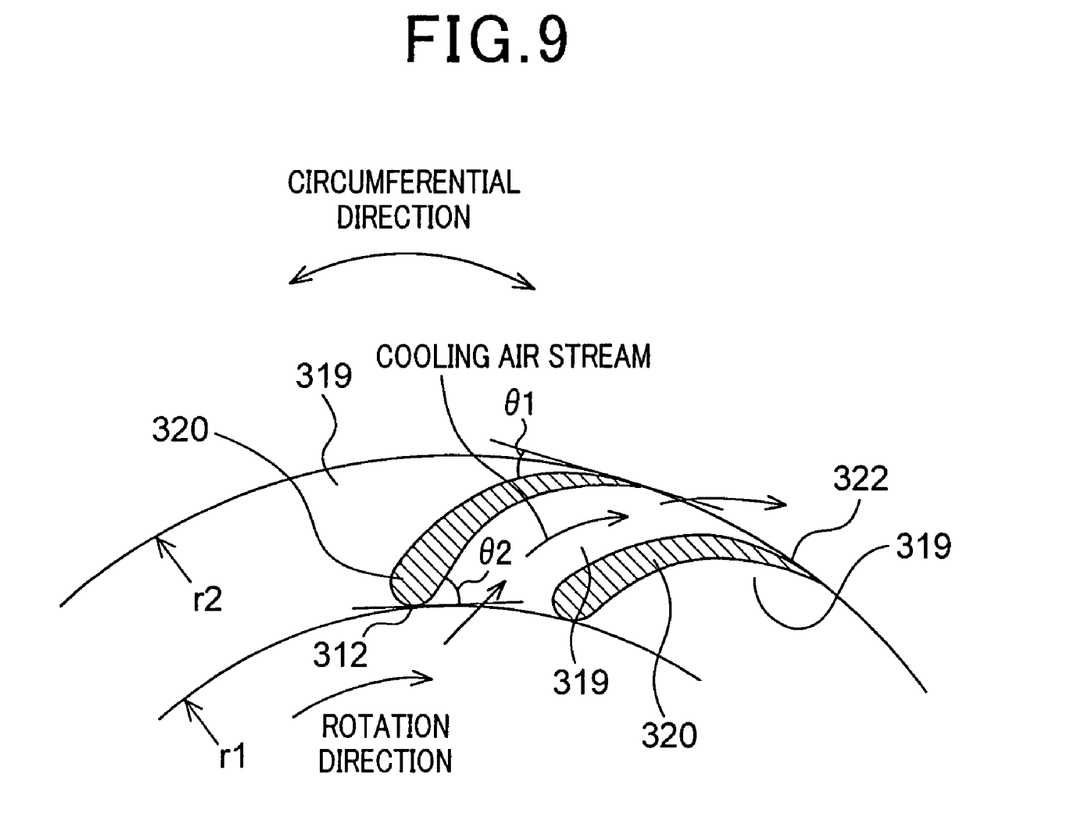
FIG. 9 is a partial axial cross-sectional view showing the major parts of the rear frame of the vehicle AC generator according to the third embodiment of the invention.

FIG. 9 is a partial axial cross-sectional view showing the linear recess grooves 319 and linear projection walls 320 as viewed from the side of the rear coil end 4d. As seen from this figure, each linear projection wall 320 has a shape roughly the same as a centrifugal fan blade, and a radially inner end 321 thereof is located upstream of a radially outer end thereof with respect to the rotation direction of the rotor. Also, as seen from this figure, each linear projection wall 320 has such a shape that the tangent inclination angle θ1 thereof at its radially outer end is smaller than the tangent inclination angle θ2 thereof at its radially inner end. In FIG. 9, r1 denotes a radius of the radially inner ends of the linear recess groove 319 and the linear projection wall 320, and r2 denotes a radius of the radially outer ends of the linear recess groove 319 and linear projection wall 320.

In the above described configuration of this embodiment, the cooling air flowing radially outward along the inner end surface 314 of the coil-end-facing portion 314 is smoothly deflected toward the axially front side, because the length of the cooling air passage leading to the knot-like projection 318 is long due to the provision of the linear recess grooves 319 and linear projection walls 320. This provides the advantages that hydraulic loss is reduced, and the cooling performance on the rear coil end 4d is further improved because a spiral flow of the cooling air is generated axially behind the rear coil end 4d.

The recess groove 319 has a large circumferential width at a portion facing the axially projecting wiring sections 41, 42, adn accordingly, interference between the axially projecting wiring section 41, 42 and the projection walls 320 can avoided easily.

The above explained preferred embodiments are exemplary of the invention of the present application which is described solely by the claims appended below. It should be understood that modifications of the preferred embodiments may be made as would occur to one of skill in the art.

What is claimed is:

1. A vehicle AC generator comprising:
   a frame including an end wall section and a peripheral wall section; a stator core fixed to an inner peripheral surface of the peripheral wall section;
   a stator coil constituted by a plurality of phase coils, the stator coil being wound around the stator core and having rear and front coil ends projecting axially rearward and frontward respectively from the stator core;
   a rotor located radially inwardly of the stator core and being rotatably supported by the frame; and
   a cooling fan having centrifugal blades and fixed to an end surface of the rotor;
   the peripheral wall section having a cooling air discharge opening adjoining the end wall section,
   the end wall section having a centrifugal-blade-facing portion axially facing the centrifugal blades, and a coil-end-facing portion axially facing the rear coil end,
   the coil-end-facing portion being bent at a predetermined curvature radius and extending from the centrifugal-blade-facing portion to the cooling air discharge opening,
   an inner end surface of the coil-end-facing portion being formed with a recess located axially rearwardly of a radial extension line of an inner end surface of the centrifugal-blade-facing portion,
   wherein the recess has a shape of circular arcs extending along a circumferential direction of the rotor,
   the rear coil end includes an axially projecting wiring section projecting axially rearward from a ring-like section thereof, and
   the axially projecting wiring section is located in a clearance between the rear coil end and the inner end surface of the coil-end-facing portion.

2. The vehicle AC generator according to claim 1, wherein the stator coil is a stator coil of the segment-sequential-connection type.

3. A vehicle AC generator comprising:
   a frame including an end wall section and a peripheral wall section; a stator core fixed to an inner peripheral surface of the peripheral wall section;
   a stator coil constituted by a plurality of phase coils, the stator coil being wound around the stator core and having rear and front coil ends projecting axially rearward and frontward respectively from the stator core;
   a rotor located radially inwardly of the stator core and being rotatably supported by the frame; and
   a cooling fan having centrifugal blades and fixed to an end surface of the rotor;
   the peripheral wall section having a cooling air discharge opening adjoining the end wall section,
   the end wall section having a centrifugal-blade-facing portion axially facing the centrifugal blades, and a coil-end-facing portion axially facing the rear coil end,
   the coil-end-facing portion being bent at a predetermined curvature radius and extending from the centrifugal-blade-facing portion to the cooling air discharge opening, an inner end surface of the coil-end-facing portion being formed with a recess located axially rearwardly of a radial extension line of an inner end surface of the centrifugal-blade-facing portion, wherein the recess has a shape of circular arcs extending along a circumferential direction of the rotor, the rear coil end includes an axially projecting wiring section projecting axially rearward from a ring-like section thereof, the axially projecting wiring section is located in a clearance between the rear coil end and the inner end surface of the coil-end-facing portion, and the axially projecting wiring section includes a crossover wiring section connecting a plurality of partial coils constituting the phase coils to one another and a neutral wiring section connecting one ends of the phase coils to a neutral point.

* * * * *